(12) United States Patent
Shimanuki et al.

(10) Patent No.: US 12,502,716 B2
(45) Date of Patent: Dec. 23, 2025

(54) CUTTING INSERT AND TURNING TOOL

(71) Applicant: TUNGALOY CORPORATION, Fukushima (JP)

(72) Inventors: Hiroki Shimanuki, Iwaki (JP); Takashi Yamaguchi, Iwaki (JP); Satoshi Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 497 days.

(21) Appl. No.: 17/996,984

(22) PCT Filed: Jan. 12, 2022

(86) PCT No.: PCT/JP2022/000799
§ 371 (c)(1),
(2) Date: Oct. 24, 2022

(87) PCT Pub. No.: WO2022/190614
PCT Pub. Date: Sep. 15, 2022

(65) Prior Publication Data
US 2023/0166335 A1    Jun. 1, 2023

(30) Foreign Application Priority Data

Mar. 10, 2021  (JP) .................................. 2021-038272

(51) Int. Cl.
*B27B 27/10*  (2006.01)
*B23B 27/10*  (2006.01)
*B23B 27/16*  (2006.01)

(52) U.S. Cl.
CPC .......... *B23B 27/1611* (2013.01); *B23B 27/10* (2013.01); *B23B 2200/123* (2013.01)

(58) Field of Classification Search
CPC ............ B23B 27/145; B23B 2200/128; B23B 27/1611; B23B 2200/123; B23B 2200/125; B23B 2200/0452
See application file for complete search history.

(56) References Cited

U.S. PATENT DOCUMENTS 4,616,962 A * 10/1986 Ushijima ................ B23C 5/202
407/113
5,443,334 A * 8/1995 Pantzar ................... B23C 5/202
407/42
(Continued)

FOREIGN PATENT DOCUMENTS

AT             15151 U1 * 11/2016 ............... B23C 5/06
DE     102013205569 A1 * 10/2013 ........... B23B 27/145
(Continued)

OTHER PUBLICATIONS

International Search Report issued in PCT/JP2022/000799; mailed Feb. 22, 2022.
(Continued)

*Primary Examiner* — Sara Addisu
(74) *Attorney, Agent, or Firm* — Studebaker Brackett PLLC (57) ABSTRACT

Provided is a cutting insert easy to be gripped by an operator or a robot hand. First and second end surfaces (10, 20) are formed in substantially polygonal shapes having second and fourth corners (B, H) formed at obtuse angles and first and third corners (A, G) formed at acute angles. A peripheral side surface (30) includes a first curved portion (41) connecting the first and third corners (A, G), a second curved portion (42) connecting the second and fourth corners (B, H), and a first side surface (31) interposed between the first and second curved portions (41, 42). The first side surface (31) is inclined with respect to a center axis (O). The second curved portion (42) is provided with a grip portion (50), and
(Continued)

the grip portion (50) includes at least one of a shape of each of plane surfaces (51, 53) chamfered parallel to the center axis (O) and a shape of a recessed portion (52) formed to be spaced apart from the first and second end surfaces (10, 20) and recessed toward the center axis (O).

5 Claims, 11 Drawing Sheets

(56) References Cited

U.S. PATENT DOCUMENTS

| | | | | |
|---|---|---|---|---|
| 5,454,670 | A * | 10/1995 | Noda | B23C 5/202 |
| | | | | 407/42 |
| 5,593,255 | A * | 1/1997 | Satran | B23C 5/109 |
| | | | | 407/116 |
| 5,807,031 | A * | 9/1998 | Arai | B23C 5/202 |
| | | | | 407/115 |
| 6,200,072 | B1 * | 3/2001 | Andersson | B23C 5/202 |
| | | | | 407/53 |
| 7,232,279 | B2 * | 6/2007 | Smilovici | B23C 5/2213 |
| | | | | 407/115 |
| 7,306,409 | B2 * | 12/2007 | Stabel | B23C 5/2213 |
| | | | | 407/115 |
| 7,431,540 | B2 * | 10/2008 | Lof | B23B 27/141 |
| | | | | 407/103 |
| 9,981,323 | B2 * | 5/2018 | Fang | B23C 5/08 |
| 10,092,965 | B2 * | 10/2018 | Burtscher | B23C 5/06 |
| 10,124,425 | B2 * | 11/2018 | Nagami | B23C 5/06 |
| 11,945,039 | B2 * | 4/2024 | Rue | B23C 5/2213 |
| 2009/0285646 | A1 * | 11/2009 | Oprasic | B23C 5/202 |
| | | | | 407/114 |
| 2010/0150671 | A1 * | 6/2010 | Oprasic | B23C 5/202 |
| | | | | 407/42 |
| 2010/0266353 | A1 * | 10/2010 | Zitzlaff | B23B 27/145 |
| | | | | 407/113 |
| 2010/0266354 | A1 * | 10/2010 | Zitzlaff | B23B 27/145 |
| | | | | 407/119 |
| 2014/0010608 | A1 * | 1/2014 | Lenischenko | B23B 27/145 |
| | | | | 407/115 |
| 2014/0193216 | A1 * | 7/2014 | Maeta | B23B 27/1611 |
| | | | | 407/113 |
| 2014/0377020 | A1 | 12/2014 | Kurokawa et al. | |
| 2015/0056028 | A1 * | 2/2015 | Ben Amor | B23B 27/145 |
| | | | | 407/113 |
| 2015/0071717 | A1 * | 3/2015 | Morrison | B23C 5/202 |
| | | | | 407/51 |
| 2015/0117970 | A1 | 4/2015 | Daub | |
| 2015/0266100 | A1 * | 9/2015 | Okamura | B23B 27/145 |
| | | | | 407/66 |
| 2016/0016233 | A1 * | 1/2016 | Sanjeevasetty | B23B 27/164 |
| | | | | 407/115 |
| 2017/0008099 | A1 * | 1/2017 | Touma | B23C 5/109 |
| 2019/0061024 | A1 * | 2/2019 | Shiroma | B23C 5/109 |
| 2019/0240746 | A1 | 8/2019 | Kitajima et al. | |
| 2020/0215618 | A1 * | 7/2020 | Hirano | B23B 27/10 |
| 2020/0254535 | A1 | 8/2020 | Knecht | |
| 2020/0276657 | A1 * | 9/2020 | Tabe | B23C 5/2213 |
| 2020/0346288 | A1 * | 11/2020 | Johansson | B23B 27/141 |
| 2021/0023634 | A1 * | 1/2021 | Eriksson | B23C 5/202 |
| 2022/0072633 | A1 * | 3/2022 | Aso | B23C 5/109 |
| 2022/0203459 | A1 * | 6/2022 | Tsujimoto | B23C 5/109 |
| 2022/0258258 | A1 * | 8/2022 | Aso | B23C 5/2213 |
| 2022/0339718 | A1 * | 10/2022 | Matsubara | B23C 5/10 |
| 2022/0395915 | A1 * | 12/2022 | Lee | B23C 5/006 |

FOREIGN PATENT DOCUMENTS

| | | | | |
|---|---|---|---|---|
| EP | 1 575 728 B1 | | 12/2007 | |
| EP | 3476508 A1 | * | 5/2019 | B23B 27/141 |
| JP | H02-053303 U | | 4/1990 | |
| JP | 05285708 A | * | 11/1993 | B23B 27/145 |
| JP | 2014-076511 A | | 5/2014 | |
| JP | 2015-519212 A | | 7/2015 | |
| JP | 6424975 B1 | | 11/2018 | |
| WO | WO-2010084485 A1 | * | 7/2010 | B23B 27/1614 |
| WO | 2013/125542 A1 | | 8/2013 | |
| WO | WO-2013175478 A2 | * | 11/2013 | B23B 27/005 |

OTHER PUBLICATIONS

International Preliminary Report On Patentability (Chapter I) and Written Opinion of the International Searching Authority issued in PCT/JP2022/000799; issued Sep. 12, 2023.

* cited by examiner

CUTTING INSERT AND TURNING TOOL

TECHNICAL FIELD

The present invention relates to a cutting insert and to a turning tool.

BACKGROUND ART

In a cutting insert having cutting edges formed not only on an upper surface thereof, but also on a lower surface thereof and can be reused by being turned upside down generally has a negative shape parallel to a center axis of the upper and lower surfaces. In a cutting insert having such a shape, a clearance angle cannot be ensured by inclining a peripheral side surface with respect to a center axis, and therefore it is inevitable to ensure the clearance angle by inclining the center axis with respect to a tool main body. A direction of the center axis is restricted, and consequently a rake angle is adjusted by causing peripheral parts of upper and lower surfaces to protrude. In order to match with the protruding peripheral parts, shapes of the portions other than the outer peripheral portions are also restricted. To escape from such restrictions, a cutting insert having a peripheral side surface which is formed in a helical shape to be inclined with respect to a center axis is also proposed (see, e.g., Patent Document 1).

CITATION LIST

Patent Document

Patent Document 1: Japanese Patent No. 6424975

SUMMARY

Technical Problem

However, in a cutting insert having such a shape as illustrated in FIGS. 15 to 22C in Patent Document 1, side surfaces opposing in a front-rear direction and in a left-right direction are not parallel, and accordingly the cutting insert is difficult to be gripped by a robot hand or the like. The cutting insert presents a new problem of being difficult to be automated by machine. It is therefore an object of the present invention to provide a cutting insert easy to be gripped by an operator or a robot hand.

Solution to Problem

A cutting insert according to an aspect of the present invention includes: a first end surface; a second end surface opposite to the first end surface; and a peripheral side surface connecting the first end surface and the second end surface. The first end surface is formed in a substantially polygonal shape having a second corner formed at a second angle that is obtuse and a first corner adjacent to the second corner and formed at a first angle smaller than the second angle. The second end surface is formed in a substantially polygonal shape having a fourth corner formed at a fourth angle that is obtuse and a third corner adjacent to the fourth corner and formed at a third angle smaller than the fourth angle. The peripheral side surface includes a first curved portion connecting the first corner and the third corner, a second curved portion connecting the second corner and the fourth corner, and a first side surface interposed between the first curved portion and the second curved portion. The first side surface is inclined with respect to a center axis extending through each of a center of the first end surface and a center of the second end surface. The second curved portion is provided with a grip portion, and the grip portion includes at least one of a shape of a plane surface chamfered parallel to the center axis and a shape of a recessed portion formed to be spaced apart from each of the first end surface and the second end surface and recessed toward the center axis.

According to this aspect, the first side surface is inclined with respect to the center axis, and therefore it is possible to adjust a clearance angle of a cutting edge by using not only an inclination angle of the center axis of the cutting insert with respect to a tool main body, but also an inclination angle of the first side surface. Accordingly, shapes of the first and second end surfaces can more freely be designed. While the first side surface is inclined, the grip portion is formed to allow the operator or the robot hand to easily grip the cutting insert. This aspect is appropriate for automation by machine.

In the above aspect, it may also be possible that the first end surface and the second end surface are formed in the same substantially rhomboidal shape, and a curved portion connecting a corner located diagonally to the second corner and a corner located diagonally to the fourth corner is also provided with the grip portion.

According to this aspect, in the substantially rhomboidal cutting insert, the grip portion can be formed at each of the pair of obtuse corners, while the cutting edge can be formed at each of a pair of acute corners. Since the cutting insert can be gripped such that that the pair of obtuse corners are held in a sandwiched state, the cutting insert is easily gripped by using a robot hand or the like.

In the above aspect, it may also be possible that the peripheral side surface further includes a third side surface opposing the first side surface, and second and fourth side surfaces connecting the first side surface and the third side surface, and each of the first side surface and the third side surface is inclined so as to be further away from the center axis with distance from the first end surface to the second end surface, while each of the second side surface and the fourth side surface is inclined so as to be closer to the center axis with distance from the first end surface to the second end surface.

According to this aspect, it is possible to configure the cutting insert such that, when the cutting edge formed on the first end surface is to be used, the first and third side surfaces are at negative clearance angles and, when the cutting edge formed on the second end surface is to be used, the second and fourth side surfaces are at negative clearance angles. Alternatively, it is also possible to configure the cutting insert such that, when the cutting edge formed on the first end surface is to be used, the second and fourth end surfaces are at positive clearance angles and, when the cutting edge formed on the second end surface is to be used, the first and third side surfaces are at positive clearance angles. In the cutting insert that can be reused by turning the first end surface and the second end surface upside down, angles of flanks can freely be designed. While the opposing side surfaces are not parallel, the grip portions are formed, and therefore the cutting insert is easy to be gripped by the operator or the robot hand.

In the above aspect, it may also be possible that the first angle is acute, the first end surface is formed in a substantially hexagonal shape which has three corners including the first corner and each formed at the first angle and three corners including the second corner and each formed at the second corner and in which the corners each formed at the first angle and the corners each formed at the second angle are alternately arranged on a one-by-one basis, and the second end surface is formed in the same shape as that of the first end surface.

According to this aspect, with regard to the substantially hexagonal cutting insert in which the acute corners and the obtuse corners are alternately arranged, the cutting insert can be gripped such that the obtuse corner and the acute corner located opposite to the obtuse corner are held in a sandwiched state. The obtuse corner having the grip portion, such as a flat portion, can be held in a sandwiched state more stably than when sides are held in a sandwiched state. Accordingly, even when the peripheral side surface including the first side surface is inclined, the cutting insert is easy to be gripped by the operator or the robot hand.

A turning tool according to another aspect of the present invention is an indexable turning tool including: a indexable cutting insert; and a tool main body that fixes the cutting insert. The cutting insert is provided with a grip portion including a shape of a recessed portion. The tool main body has an injection hole from which a coolant is to be injected toward a cutting edge formed at a first corner, and is configured such that at least a part of the coolant reaching the cutting edge from the injection hole passes through the inside of the recessed portion.

According to this aspect, the grip portion is formed, and therefore the cutting insert is easy to be gripped by an operator or a robot hand. In addition, since the coolant is injected so as to pass through the inside of the recessed portion included in the grip portion, it is possible to reduce a rate of the coolant colliding with the side surface of the cutting insert to be diffused and increase an amount of the coolant reaching the cutting edge. By providing a space which is wider due to the recessed portion in a direction of travel of the injection hole from which the coolant is to be injected, it is possible to bring a position of the injection hole closer to the cutting edge than that in a cutting insert having no recessed portion. Since the position of the injection hole is closer, it is possible to accordingly increase the amount of the coolant reaching the cutting edge and efficiently discharge chip.

Advantageous Effects of Invention

According to the present invention, it is possible to provide a cutting insert easy to be gripped by an operator or a robot hand.

DESCRIPTION OF EMBODIMENTS

Referring to the accompanying drawings, a description will be given of preferred embodiments of the present invention. Note that, throughout the individual drawings, components denoted by the same reference signs have the same or similar configurations. One of characteristic features of a cutting insert 2 in each of the embodiments of the present invention is that, at each of obtuse corners B, D, F . . . formed in a first end surface 10, obtuse corners H, I, J, L . . . formed in a second end surface 20, and curved portions 42, 44, 46, 48 . . . connecting the upper and lower obtuse corners, a peripheral side surface 30 is provided with a grip portion 50 (see FIG. 3). The grip portion 50 includes at least one of a shape of a plane surface 51 (see FIG. 7) chamfered parallel to a center axis O of the first and second end surfaces 10 and 20 and a shape of a recessed portion 52 (see FIG. 9) formed in a middle portion between and spaced apart from the first and second end surfaces 10 and 20 and recessed toward the center axis O. Each of the grip portions 50 may be a combination of the recessed portion 52 and a plane surface 53 (see FIG. 10) or include a plurality of the plane surfaces 51 and 53 (see FIG. 2).

Since the cutting insert 2 has side surfaces 31, 32, 33, 34, 35, 36 . . . that are inclined with respect to the center axis O (see FIGS. 5 and 6), when such side surfaces are held in a sandwiched state, a part of a horizontal force for the holding undesirably causes inclined surfaces to generate vertical components. A robot hand tends to move out of place along the inclined side surfaces. According to the present embodiment, the cutting insert 2 is easy to be gripped by holding the grip portions 50 provided at the obtuse corners in a sandwiched state, while the side surfaces 31, 32, 33, 34, 35, 36 . . . of the cutting insert 2 are hard to grip. Accordingly, the cutting insert is appropriate for automation by machine. As long as the grip portion 50 includes an element of the recessed portion 52, it is possible to inject a coolant through the recessed portion 52 (see FIG. 1). A detailed description will be given below of each of configurations with reference to FIGS. 1 to 11.

Figure 1:
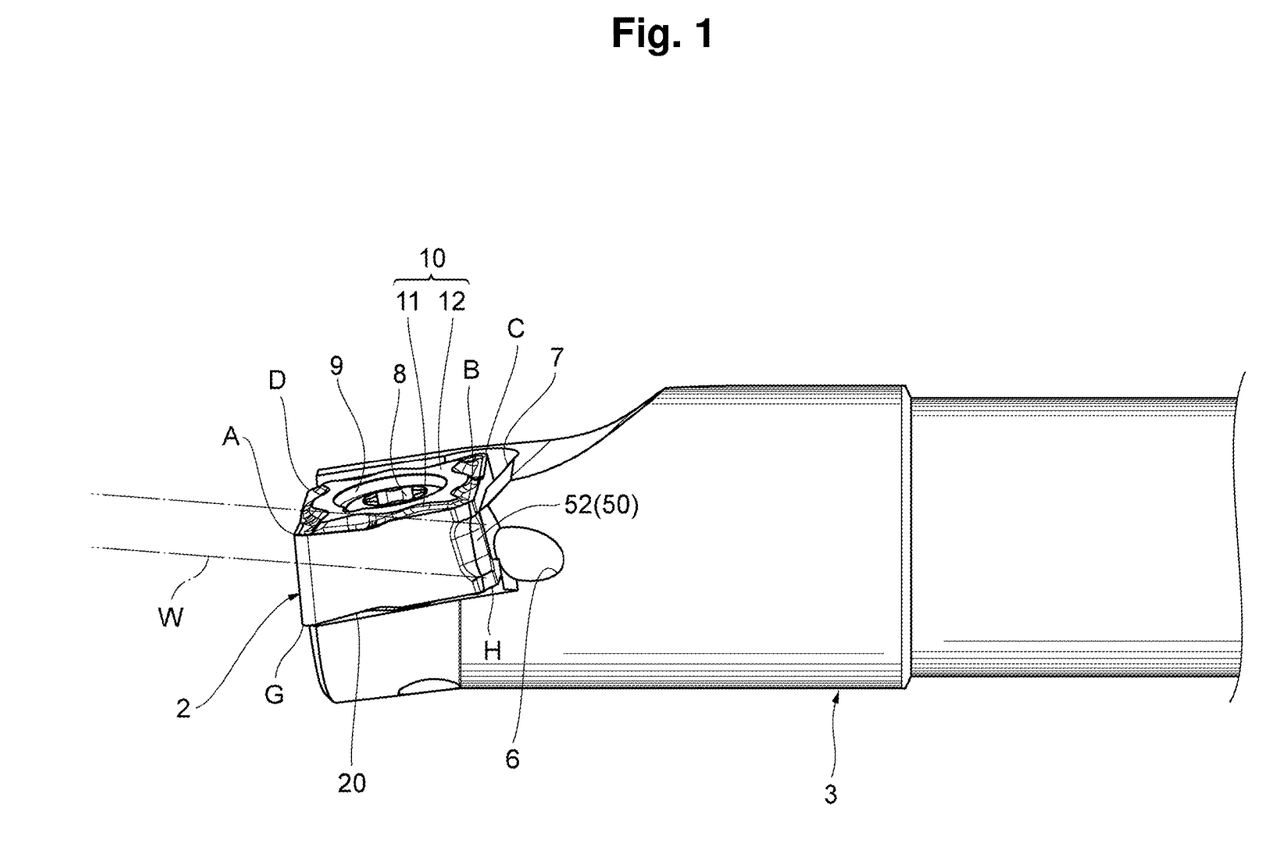
FIG. 1 is a perspective view illustrating an example of a turning tool including a cutting insert in a first embodiment of the present invention.

FIG. 1 is a perspective view illustrating an example of a turning tool 1 including the cutting insert 2 in the first embodiment of the present invention. As illustrated in FIG. 1, the indexable turning tool 1 includes the indexable cutting insert 2 and a tool main body 3 that fixes the cutting insert 2, and is fixed to a tool rest or the like to be used. A leading end portion including a leading end of the tool main body 3 and a portion in the vicinity thereof is provided with an insert mounting seat 7 and with an injection hole 6 from which the coolant is to be injected to the cutting insert 2 retrained by the insert mounting seat 7.

Figure 2:
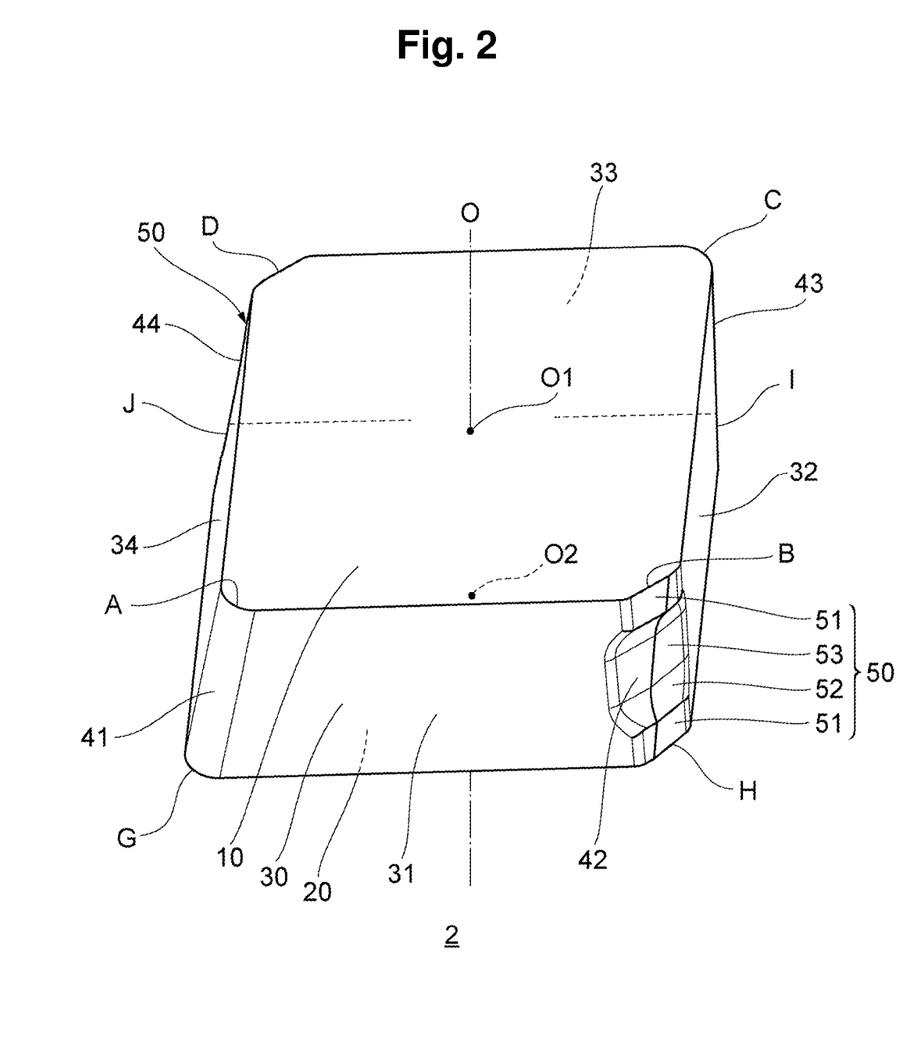
FIG. 2 is a perspective view illustrating an example of the cutting insert in the first embodiment of the present invention.

FIG. 2 is a perspective view illustrating an example of the cutting insert 2 in the first embodiment of the present invention. A material for the cutting insert 2 is not particularly limited, and various materials for cutting inserts represented by a cemented carbide are applicable. As illustrated in FIG. 2, the cutting insert 2 has the first end surface 10, the second end surface 20 opposite to the first end surface 10, and the peripheral side surface 30 connecting the first and second end surfaces 10 and 20 to each other.

Note that, to emphasize the peripheral side surface 30 serving as a material part of the present invention, in each of the drawings including and subsequent to FIG. 2, shapes of the first and second end surfaces 10 and 20 are illustrated in a simplified manner. As illustrated in FIG. 1, the first and second end surfaces 10 and 20 have a mounting hole 9 extending through the first and second end surfaces 10 and 20, cutting edges formed along edges ABCD and GHIJ, a rake surface 11 facing the cutting edge, a projecting surface 12 projecting from the rake surface 11, and the like. When the cutting insert 2 is placed on a horizontal surface such as that of a surface plate, the cutting insert 2 comes into contact with the horizontal surface at the projecting surface 12 to be supported thereby. In the illustrated example, the projecting surface 12 is formed as a flat plane surface to surround the mounting hole 9. The projecting surface 12 of the first end surfaces 10 and a projecting surface of the second end surface 20 not shown are formed in parallel to each other.

At least a part of the edge ABCD at which the first end surface 10 and the peripheral side surface 30 cross each other is formed with the cutting edge. Likewise, at least a part of the edge GHIJ at which the second end surface 20 and the peripheral side surface 30 cross each other is formed with the cutting edge. In the illustrated example, at the acute corners A and C of the first end surface 10 and at the acute corners G and I of the second end surface 20, corner cutting edges are formed, and major cutting edges (side cutting edges) and minor cutting edges (end cutting edges) are formed such that the individual corner cutting edges are interposed therebetween. A configuration of the cutting edges is not limited to that in the illustrated example. A detailed description will be given later of the cutting edges with reference to FIGS. 3 and 4.

In the illustrated example, the peripheral side surface 30 includes the first to fourth side surfaces 31, 32, 33, and 34 each formed as a plane surface and the first to fourth curved portions 41, 42, 43, and 44 providing connection therebetween. The first to fourth side surfaces 31, 32, 33, and 34 are formed at positions facing sides AB, BC, CD, and DA of the first end surface 10, while the first to fourth curved portions 41, 42, 43, and 44 are formed at positions facing the corners A, B, C, and D of the first end surface 10. In other words, in the peripheral side surface 30, the first side surface 31 is interposed between the first and second curved portions 41 and 42, the second side surface 32 is interposed between the second and third curved portions 42 and 43, the third side surface 33 is interposed between the third and fourth curved portions 43 and 44, and the fourth side surface 34 is interposed between the fourth and first curved portions 44 and 41.

Figure 3:
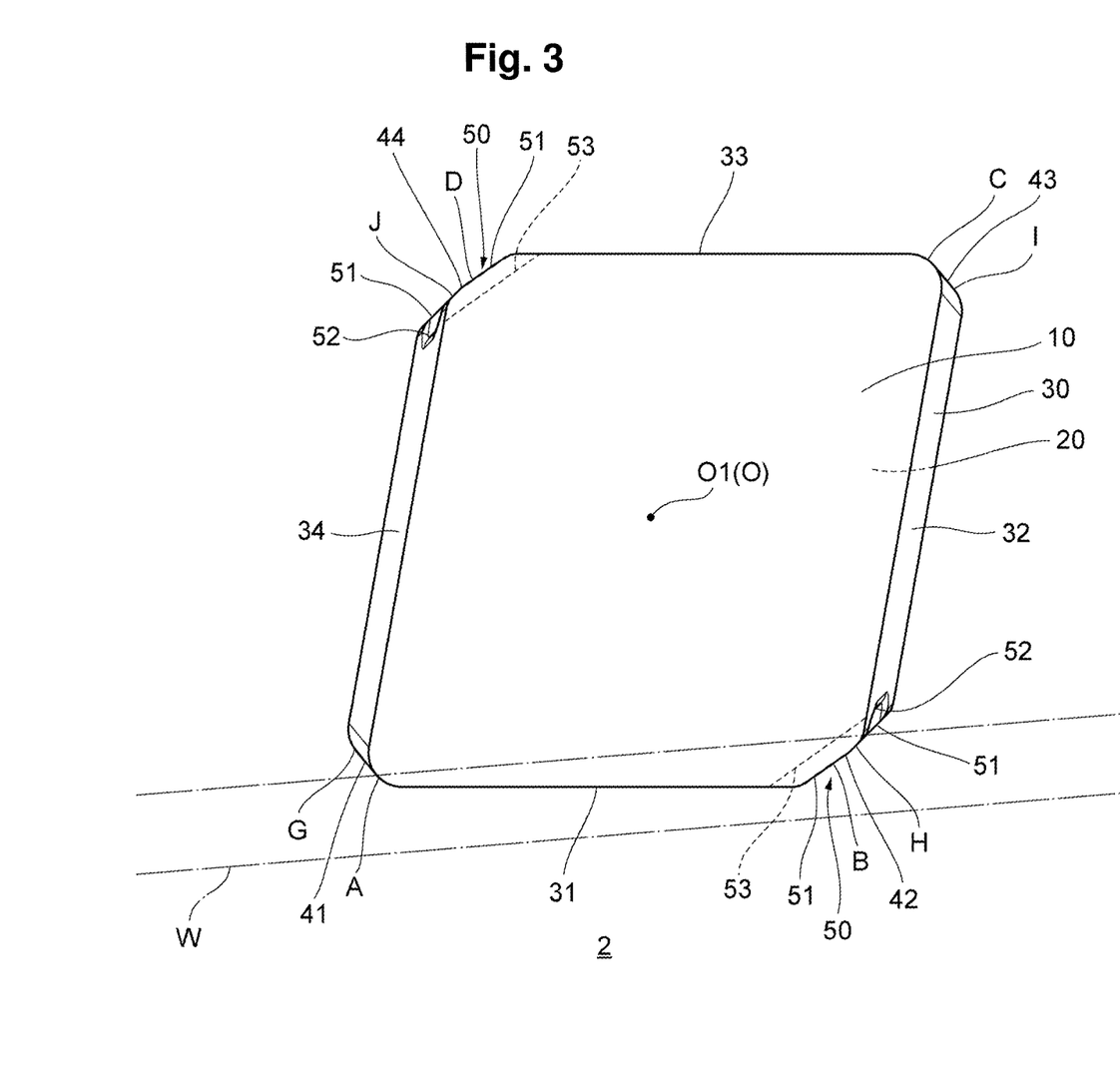
FIG. 3 is a plan view obtained by viewing the cutting insert illustrated in FIG. 2 from a first end surface.
Figure 4:
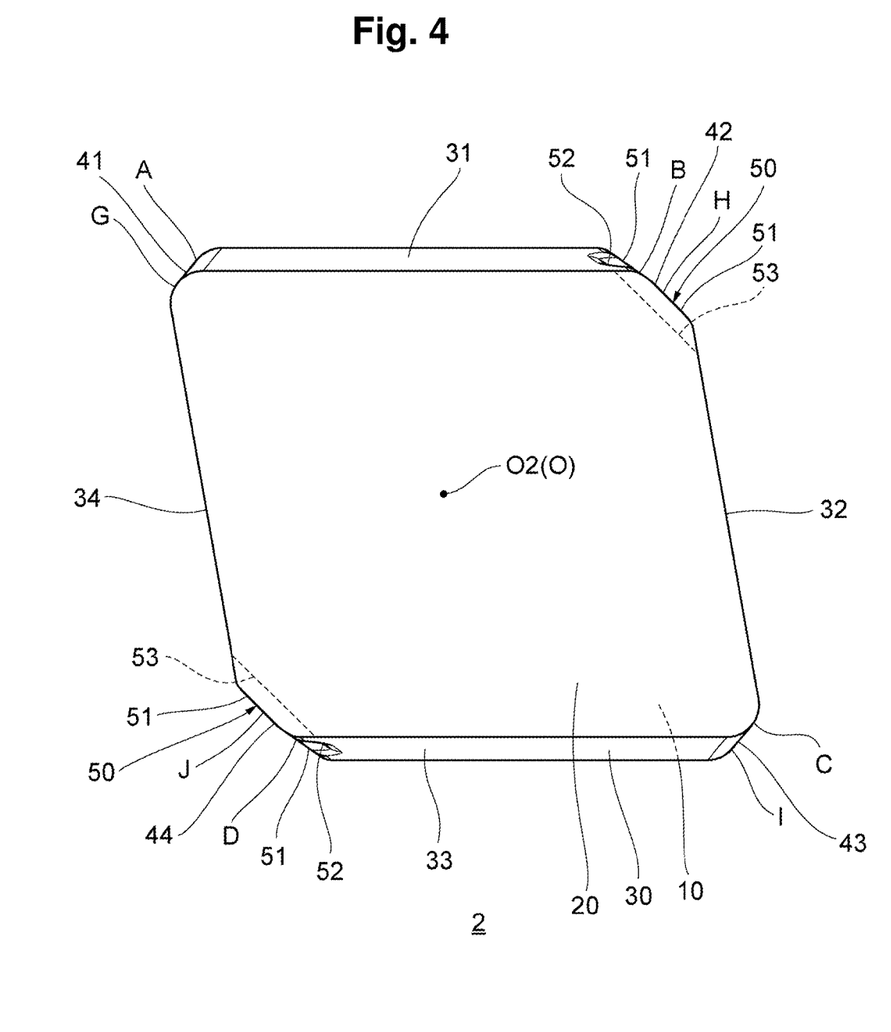
FIG. 4 is a bottom view obtained by viewing the cutting insert illustrated in FIG. 2 from a second end surface.

FIG. 3 is a plan view obtained by viewing the cutting insert 2 illustrated in FIG. 2 from the first end surface 10. FIG. 4 is a bottom view obtained by viewing the cutting insert 2 illustrated in FIG. 2 from the second end surface 20. In the illustrated example, the first and second end surfaces 10 and 20 have substantially the same shape and function. It may be possible that, in the turning tool 1, the first end surface 10 is on an upper surface side (a rake surface side of the cutting edge), while the second end surface 20 is on a lower surface side (a restrained surface side to be seated on the tool main body 3). It may also be possible that, as a result of turning the cutting insert 2 upside down, the second end surface 20 is on the upper surface side, while the first end surface 10 is on the lower surface side. Accordingly, a detailed description may be given of the first end surface 10 as a representative, while a repetitive description may be omitted for the second end surface 20. Note that the first and second end surfaces 10 and 20 need not necessarily have the same shape.

In the illustrated example, the first end surface 10 has a substantially rhomboidal shape having the four corners A, B, C, and D, and is formed 180° symmetrically around a center O1. Likewise, the second end surface 20 has a substantially rhomboidal shape having the four corners G, H, I, and J, and is formed 180° symmetrically around a center O2. In the following description, a straight line connecting the center O1 of the first end surface 10 and the center O2 of the second end surface 20 is referred to as the center axis O of the first and second end surfaces 10 and 20. Note that the center axis O may also be a center axis of the mounting hole 9 extending through the first and second end surfaces 10 and 20 illustrated in FIG. 1. When the shapes of the first and second end surfaces 10 and 20 are not point-symmetrical, respective centers of gravity thereof may also be the centers O1 and O2. The center axis O is perpendicular to the projecting surfaces of the first and second end surfaces 10 and 20.

The major cutting edges previously described extend along the side AB from the acute corner A toward the obtuse corner B, extend along the side CD from the acute corner C toward the obtuse corner D, extend along a side GJ from the acute corner G toward the obtuse corner J, and extend along a side IH from the acute corner I toward the obtuse corner H. The major cutting edges are formed so as to be substantially parallel to a longitudinal direction of the tool main body 3 in a state where the cutting insert 2 is fixed to the tool main body 3.

The minor cutting edges previously described extend along the side AD from the acute corner A toward the obtuse corner D, extend along the side CB from the acute corner C toward the obtuse corner B, extend along a side GH from the acute corner G toward the obtuse corner H, and extend along a side IJ from the acute corner I toward the obtuse corner J. The minor cutting edges are formed so as to be substantially parallel to a width direction of the tool main body 3 in a state where the cutting insert 2 is fixed to the tool main body 3.

In the illustrated example, each of the acute corners A, C, G, and I is formed at 80°, while each of the obtuse corners B, D, H, and J is formed at 100°. With regard to specific inventive matters of the present invention, in the first embodiment and the second to fourth embodiments described later, an example of second and fourth angles as obtuse angles is 100°, an example of first and third angles smaller than the second and fourth angles is 80°, an example of a second corner formed at the second angle is the corner B, an example of a first corner adjacent to the second corner and formed at the first angle is the corner A, an example of a fourth corner formed at the fourth angle is the corner H, and an example of a third corner adjacent to the fourth corner and formed at the third angle is the corner G.

Figure 5:
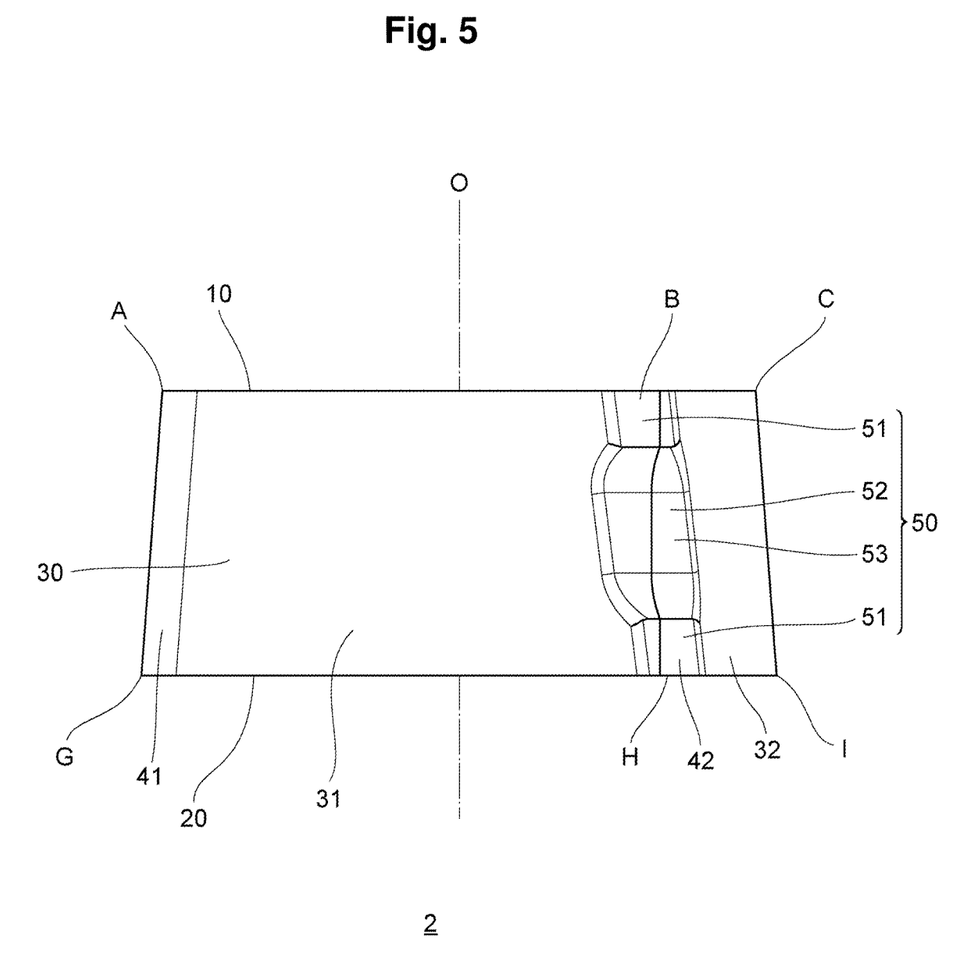
FIG. 5 is a side view obtained by viewing the cutting insert illustrated in FIG. 2 from a first side surface.

FIG. 5 is a side view obtained by viewing the cutting insert 2 illustrated in FIG. 2 from the first side surface 31. As illustrated in FIGS. 5 and 3, each of the second and fourth side surfaces 32 and 34 opposing each other is inclined from the first end surface 10 to the second end surface 20, i.e., to be downwardly further away from the center axis O. In other words, a distance between the second and fourth side surfaces 32 and 34 downwardly increases.

Figure 6:
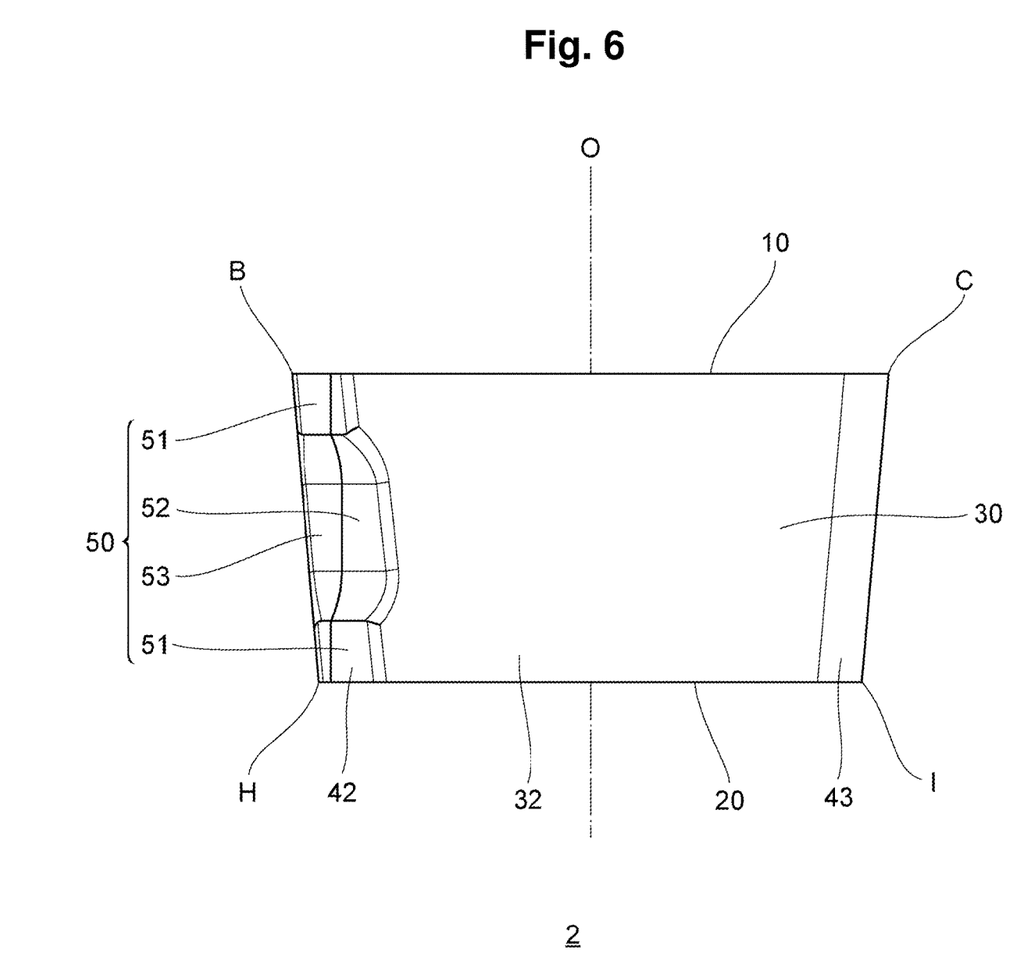
FIG. 6 is a side view obtained by viewing the cutting insert illustrated in FIG. 2 from a second side surface.

FIG. 6 is a side view obtained by viewing the cutting insert 2 illustrated in FIG. 2 from the second side surface 32. As illustrated in FIGS. 6 and 4, each of the first and third side surfaces 31 and 33 opposing each other is inclined from the first end surface 10 to the second end surface 20, i.e., to be downwardly closer to the center axis O. In other words, a distance between the first and third side surfaces 31 and 33 downwardly decreases.

Referring to FIGS. 2 and 3, a description will be given below of the grip portions 50. One of characteristic features of the substantially rhomboidal cutting insert 2 illustrated in FIGS. 2 to 10 is that not the pair of acute corners A and C to be used as the cutting edges, but the pair of obtuse corners B and D not to be used as the cutting edges are formed with the respective grip portions. As illustrated in FIG. 3, the curved portions 42 and 44 connecting the obtuse corners B and D of the first end surface 10 and the obtuse corners H and I of the second end surface 20 are provided with the respective grip portions 50. In the first embodiment, as illustrated in FIG. 2, each of the grip portions 50 includes the flat plane surfaces (flat surfaces) 51, 51 chamfered parallel to the center axis O, the recessed portion 52 vertically interposed between the plane surfaces 51, and the flat plane surface (flat surface) 53 formed at a bottom portion of the recessed portion 52 to be parallel to the center axis O.

As illustrated in FIG. 3, the plane surfaces 51 and 53 are formed in parallel to the center axis O. In other words, the plane surfaces 51 and 53 are formed perpendicular to the first and second end surfaces 10 and 20. In the illustrated in example, at each of the corners B and D, the upper plane surface 51 facing the first end surface 10 and the lower plane surface 51 facing the second end surface 20 are formed flush. In the illustrated example, the plane surface 51 at the corner B and the plane surface 51 at the corner D which are diagonally located across the first end surface 10 are formed in parallel to each other, while the plane surface 53 at the corner B and the plane surface 53 at the corner D are formed in parallel to each other. In the illustrated example, at each of the corners B and D, the plane surfaces 51 and 53 are formed in parallel to each other. Note that a configuration of the plane surfaces 51 and 53 is not limited to that in the illustrated example. For example, the plane surface 51 at the corner B and the plane surface 51 at the corner D which are diagonally located need not be parallel to each other or, at the corner B, the plane surface 51 and the plane surface 53 need not be parallel to each other.

Figure 9:
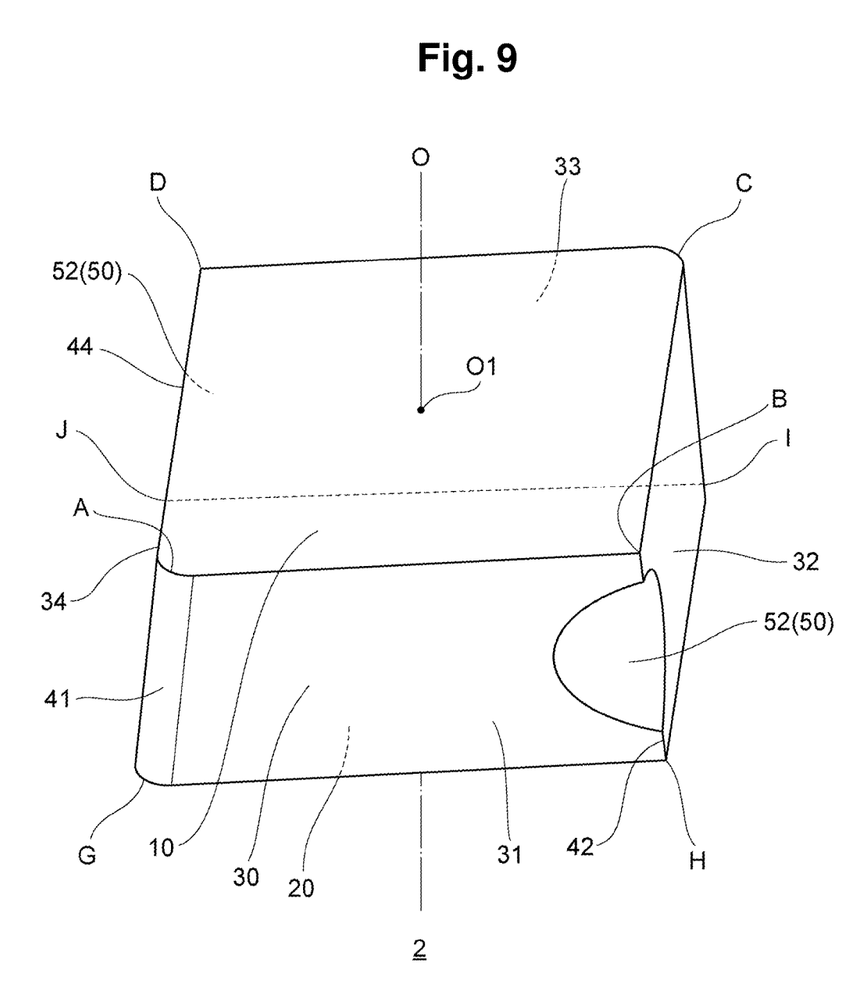
FIG. 9 is a perspective view illustrating an example of a cutting insert in a third embodiment of the present invention.

As illustrated in FIG. 2, the plane surface 51 in the second curved portion 42 is formed in such a manner as to scrape off (chamfer) a virtual edge passing through a vertex (e.g., a vertex of the corner B in the third embodiment illustrated in FIG. 9) corresponding to the second corner when the first end surface 10 is approximated to a polygon and through a vertex (e.g., a vertex of the corner H in the third embodiment illustrated in FIG. 9) corresponding to the fourth corner when the second end surface 20 is approximated to a polygon.

As illustrated in FIG. 2, the recessed portion 52 is formed to be spaced apart from the first and second end surfaces 10 and 20 and inwardly recessed toward the center axis O. In the illustrated example, the recessed portion is formed at a vertical middle of the first curved portion 41, i.e., in a middle portion of the first curved portion 41 equidistant from the first and second end surfaces 10 and 20 in an axial direction of the center axis O. A part of the coolant injected from the injection hole 6 (illustrated in FIG. 1) toward the cutting edge of the cutting insert 2 collides with the peripheral side surface 30 of the cutting insert 2 to be diffused, and therefore cannot reach the cutting edge. In FIG. 3, the one-dot-dash line represents a trajectory W of the coolant in a state where the cutting insert 2 is detached from the insert mounting seat 7.

As illustrated in FIG. 3, when the trajectory W of the coolant when there is no obstacle is projected in parallel to the center axis O onto the cutting insert 2 restrained by the insert mounting seat 7, at least a part of the trajectory W is superimposed on the recessed portion 52. In other words, at least a part of the coolant having reached the cutting edge passed through the inside of the recessed portion 52. By providing a frontage which is wider due to the recessed portion 52 in a direction of travel of the injection hole 6 from which the coolant W is injected, it is possible to reduce a rate of the coolant W colliding with the peripheral side surface 30 of the cutting insert 2 to be diffused and increase an amount of the coolant reaching the cutting edge.

A depth of the recessed portion 52, i.e., a distance between the plane surface 51 and the plane surface 53 is not limited to that in the illustrated example. For example, the recessed portion 52 may also be formed shallower as long as the depth thereof is sufficient to prevent the cutting insert from slipping and falling down when the cutting insert is gripped by a robot hand or the like. The recessed portion 52 may also be formed deeper so as to retract from the trajectory W of the coolant traveling from the injection hole 6 toward the cutting edge. When attention is focused on the plane surface 53 serving as the bottom portion of the recessed portion 52 in the grip portion 50, it can also be considered that the plane surface 51 projects from the plane surface 53. Since the plane surface 51 projects from the plane surface 53, a contact area between the peripheral side surface 30 (the second and third side surfaces 32 and 33) and the insert mounting seat 7 of the tool main body 3 is accordingly larger, and therefore the state in which the cutting insert 2 is restrained is stabilized in the vicinity of the first and second end surfaces 10 and 20.

In the cutting insert 2 in the first embodiment configured as described above, in the cutting insert having the first end surface end surfaces each formed in the substantially rhomboidal shape, not the acute first corner A, but each of the obtuse second corner B and the obtuse corner D located diagonally thereto is formed with the grip portion. Accordingly, in the substantially rhomboidal cutting insert, it is possible to form each of the pair of obtuse corners with the grip portion and form each of the pair of acute corners with the cutting edge. The cutting insert can be gripped such that the pair of obtuse corners are held in a sandwiched state. While the first side surface 31 is inclined, the grip portions 50 are formed, and accordingly the cutting insert is easy to be gripped by an operator or a robot hand. The cutting insert is appropriate for automation by machine. In the first embodiment, each of the grip portions 50 includes a plurality of easy-to-grip shapes which are those of the two plane surfaces 51, the recessed portion 52, and the plane surface 53, resulting in a high degree of freedom in choosing how to grip. The cutting insert can be used with a variety of robot hands or the like. Since a position of the injection hole 6 can be designed such that a part of the coolant passes through the recessed portion 52, it is possible to bring the position of the injection hole 6 closer to the cutting edge than that in the cutting insert 2 in the second embodiment not having the recessed portion 52.

Subsequently, a description will be given of the cutting inserts 2 in the second to fifth embodiments with reference to FIGS. 7 to 11. Note that components having the same or similar functions as those in the first embodiment are denoted by the same reference signs, and a description thereof is omitted herein by taking the corresponding statements in the first embodiment into consideration. The components other than those described below are the same as in the first embodiment.

Figure 7:
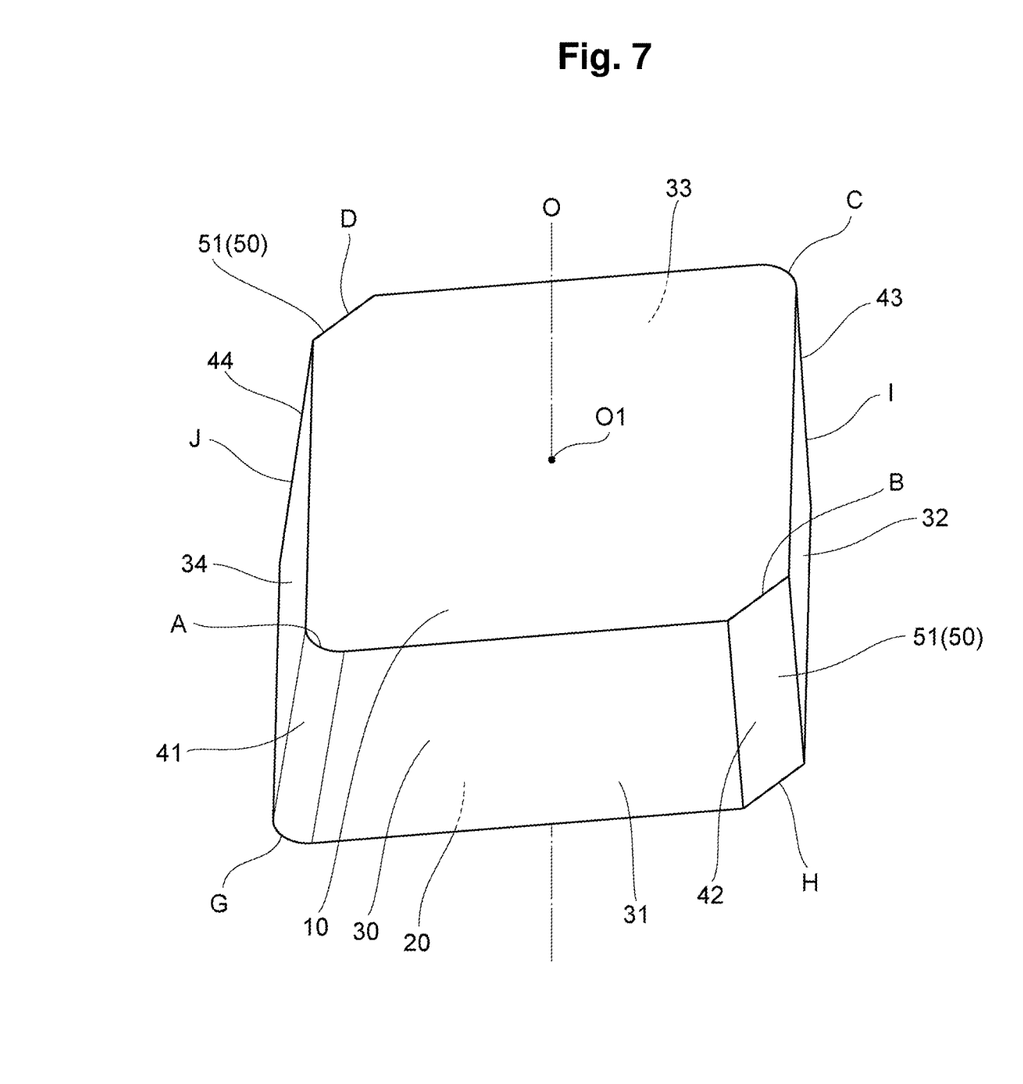
FIG. 7 is a perspective view illustrating an example of a cutting insert in a second embodiment of the present invention.
Figure 8:
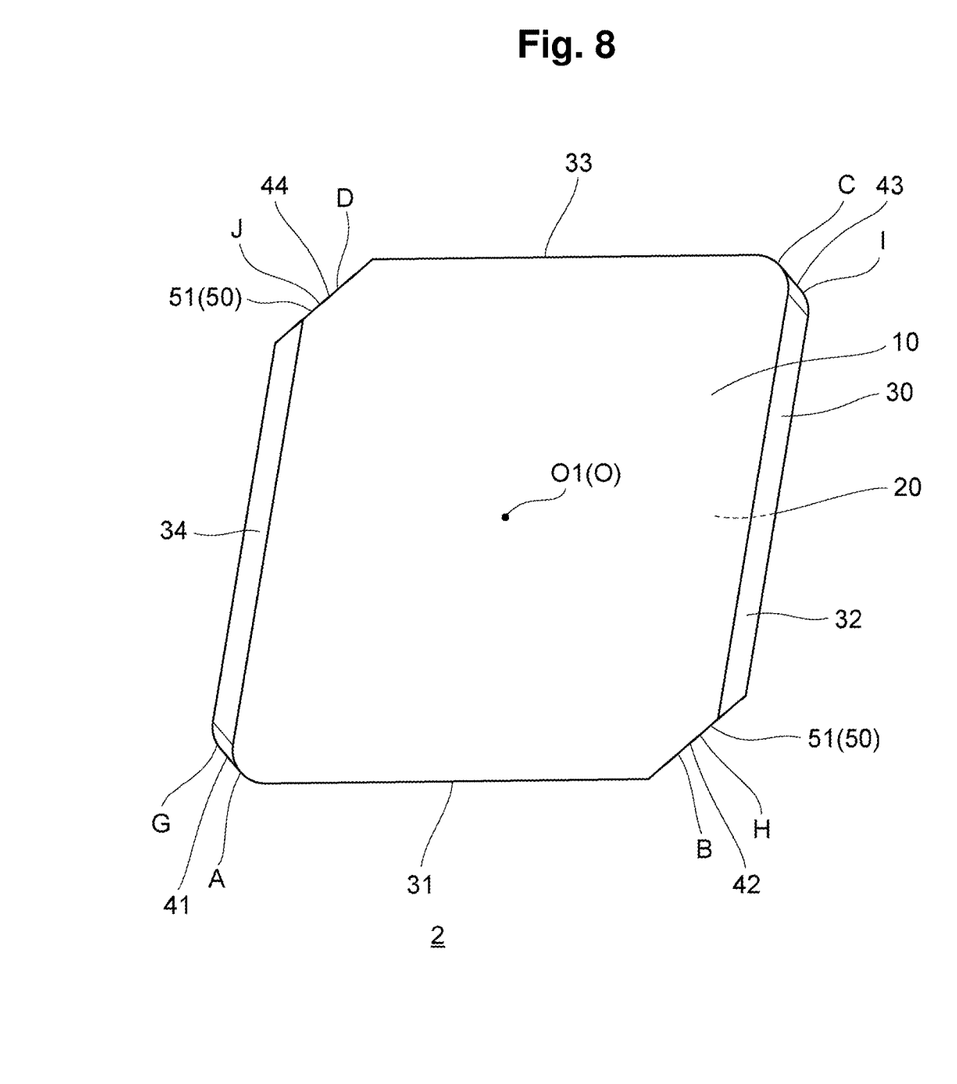
FIG. 8 is a plan view obtained by viewing the cutting insert illustrated in FIG. 7 from a first end surface.

FIG. 7 is a perspective view illustrating an example of the cutting insert 2 in the second embodiment of the present invention. FIG. 8 is a plan view obtained by viewing the cutting insert 2 illustrated in FIG. 7 from the first end surface 10. As illustrated in FIG. 7, the second embodiment is different from the first embodiment in that each of the grip portions 50 includes only the plane surface 51 chamfered parallel to the center axis O. In the example illustrated in FIG. 8, the plane surfaces 51 formed at the respective obtuse corners B and D are formed in parallel to each other. According to the second embodiment, in the same manner as in the first embodiment, the cutting insert 2 easy to be gripped by an operator or a robot hand can be provided.

FIG. 9 is a perspective view illustrating an example of the cutting insert 2 according to the third embodiment of the present invention. As illustrated in FIG. 9, the third embodiment is different from the first embodiment in that each of the grip portions 50 includes only the recessed portion 52 recessed toward the center axis O. According to the third embodiment, in the same manner as in the first embodiment, it is possible to allow a finger of an operator or a leading end of a robot arm to be hooked into the recessed portion 52, and accordingly the cutting insert is easy to be gripped. Since the position of the injection hole 6 can be designed such that a part of the coolant passes through the recessed portion 52, it is possible to bring the position of the injection hole 6 closer to the cutting edge.

Figure 10:
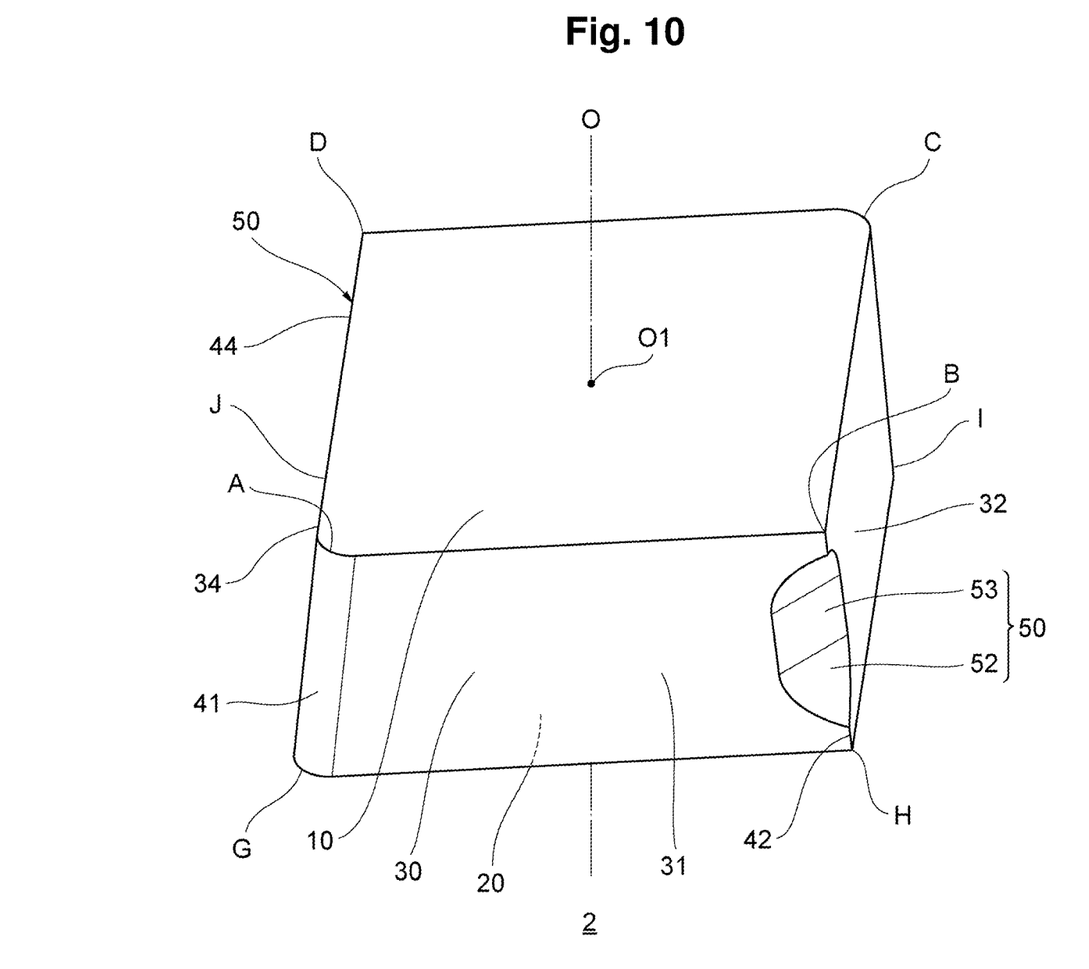
FIG. 10 is a perspective view illustrating an example of a cutting insert in a fourth embodiment of the present invention.

FIG. 10 is a perspective view illustrating an example of the cutting insert in the fourth embodiment of the present invention. As illustrated in FIG. 10, the fourth embodiment is different from the third embodiment in that the plane surface 53 is formed at the bottom portion of the recessed portion 52 and, in addition to the recessed portion 52 recessed toward the center axis O, the shape of the plane surface 53 formed in parallel to the center axis O at the bottom portion of the recessed portion 52 is further included. According to the fourth embodiment, in the same manner as in the first and third embodiments, it is possible to allow a finger of an operator or a leading end of a robot arm to be hooked into the recessed portion 52. In the same manner as in the first embodiment, it is also possible to hold the plane surface 53 formed at the bottom portion of the recessed portion 52 in a sandwiched state.

Figure 11:
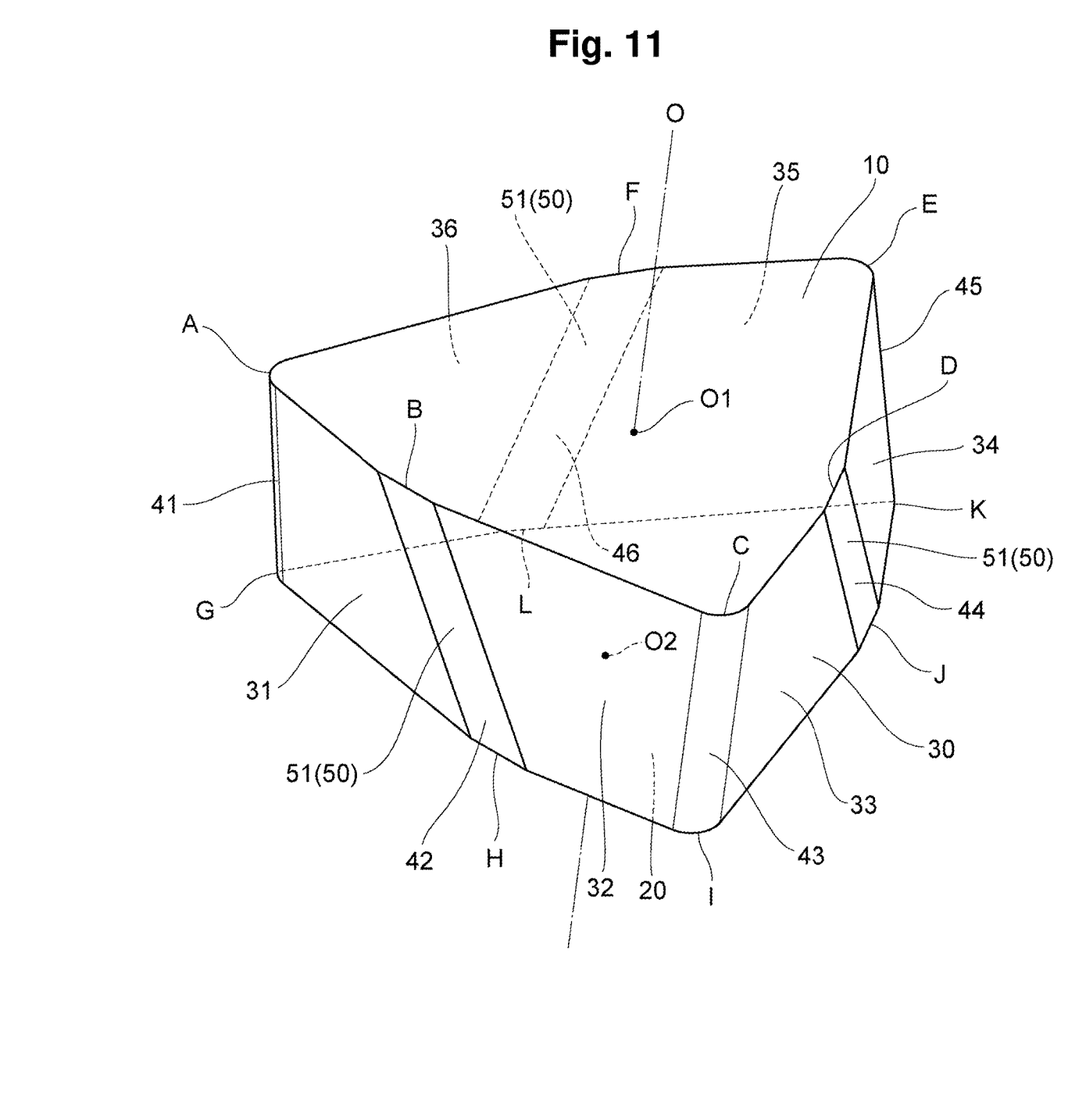
FIG. 11 is a perspective view illustrating an example of a cutting insert in a fifth embodiment of the present invention.

FIG. 11 is a perspective view illustrating an example of the cutting insert in the fifth embodiment of the present invention. The fifth embodiment is different from the second embodiment in that each of the first and second end surfaces 10 and 20 is not substantially rhomboidal. The first end surface 10 is formed in a substantially hexagonal shape in which the three corners A, C, and E formed at acute angles and the three corners B, D, and F formed at obtuse angles are alternately arranged. The second end surface 20 is formed in a substantially hexagonal shape in which the three corners G, I, and K formed at acute angles and the three corners H, J, and L formed at obtuse angles are alternately arranged. In the curved portions 42, 44, and 46 connecting the obtuse corners, the respective grip portions 50 are formed.

In the illustrated example, the acute corners A, C, E, G, I, and K are each formed at 80°, while the obtuse corners B, D, F, H, J, and L are each formed at 160°. With regard to specific inventive matters of the present invention, in the fifth embodiment, an example of the second and fourth angles that are obtuse is 160°, an example of the first and third angles smaller than the second and fourth angles is 80°, an example of the second corner formed at the second angle is the corner B, an example of the first corner adjacent to the second corner and formed at the first angle is the corner A, an example of the fourth corner formed at the fourth angle is the corner H, and an example of the third corner adjacent to the fourth corner and formed at the third angle is the corner G.

The first side surface 31 (plane ABHG) interposed between the first and second curved portions 41 and 42 is inclined so as to be closer to the center axis O with distance from the first end surface 10 to the second end surface 20. The second side surface 32 (plane BCIH) interposed between the second and third curved portions 42 and 43 is inclined so as to be further away the center axis O with distance from the first end surface 10 to the second end surface 20. Likewise, the third to sixth side surfaces 33, 34, 35, and 36 are inclined with respect to the center axis O. Meanwhile, the plane surface 51 configured as the grip portion 50 is formed in parallel to the center axis O. Note that the grip portion 50 is not limited to that in the illustrated example. The grip portion 50 may also include the recessed portion 52 recessed toward the center axis O.

According to the fifth embodiment, the cutting insert 2 can be gripped such that, e.g., the grip portion 50 provided at the obtuse corner B and the acute corner E located diagonally opposite to the corner B are held in a sandwiched state. The grip portion 50, such as the plane surface 51 formed flat at the obtuse corner B, can more stably be held in a sandwiched state than when the inclined first side surface 31 facing the side AB or the like is held in a sandwiched state, and therefore the cutting insert 2 is easier to be gripped by an operator or a robot hand.

The embodiments described above are intended to facilitate understanding of the present invention and should not be construed to limit the present invention. Constituent elements included in the embodiments and arrangements, materials, conditions, shapes, sizes, and the like thereof are not limited to those exemplified and can appropriately be modified. It is also possible to partially substitute or combine configurations described in different embodiments.

REFERENCE SIGNS LIST

1 Turning tool
2 Cutting insert
3 Tool main body
6 Injection hole
7 Insert mounting seat
8 Fastening screw
9 Mounting hole
10 First end surface
11 Rake surface
12 Projecting surface
20 Second end surface
30 Peripheral side surface
31 to 36 First to sixth side surfaces
41 to 46 First to sixth curved portions
50 Grip portion
51, 53 Plane surface
52 Recessed portion
A to F Corners of first end surface
G to L Corners of second end surface
O Center axis
O1 Center of first end surface
O2 Center of second end surface
W Trajectory of coolant

What is claimed is:

1. A cutting insert comprising:
a first end surface;
a second end surface opposite to the first end surface; and
a peripheral side surface connecting the first end surface and the second end surface,
the first end surface being formed in a substantially polygonal shape having a second corner formed at a second angle that is obtuse and a first corner adjacent to the second corner and formed at a first angle smaller than the second angle,
the second end surface being formed in a substantially polygonal shape having a fourth corner formed at a fourth angle that is obtuse and a third corner adjacent to the fourth corner and formed at a third angle smaller than the fourth angle,
the peripheral side surface including a first curved portion connecting the first corner and the third corner, a second curved portion connecting the second corner and the fourth corner, and a first side surface interposed between the first curved portion and the second curved portion,
the first side surface being inclined with respect to a center axis extending through each of a center of the first end surface and a center of the second end surface,
the second curved portion being provided with a grip portion,
the grip portion including a shape of a recessed portion formed to be spaced apart from each of the first end surface and the second end surface and recessed toward the center axis, and
in the second corner, a flat plane surface perpendicular to a bisector of the second angle is formed at the recessed portion.

2. The cutting insert according to claim 1, wherein
the first end surface and the second end surface are formed in the same substantially rhomboidal shape, and
a curved portion connecting a corner located diagonally to the second corner and a corner located diagonally to the fourth corner is also provided with the grip portion.

3. The cutting insert according to claim 2, wherein
the peripheral side surface further includes a third side surface opposing the first side surface, and second and fourth side surfaces connecting the first side surface and the third side surface, and
each of the first side surface and the third side surface is inclined so as to be further away from the center axis with distance from the first end surface to the second end surface, while each of the second side surface and the fourth side surface is inclined so as to be closer to the center axis with distance from the first end surface to the second end surface.

4. The cutting insert according to claim 1, wherein
the first angle is acute,
the first end surface is formed in a substantially hexagonal shape which has three corners including the first corner and each formed at the first angle, and three corners including the second corner and each formed at the second angle and in which the corners each formed at the first angle and the corners each formed at the second angle are alternately arranged on a one-by-one basis, and
the second end surface is formed in the same shape as that of the first end surface.

5. An indexable turning tool comprising:
a indexable cutting insert; and
a tool main body that fixes the cutting insert,
the cutting insert including:
a first end surface;
a second end surface opposite to the first end surface; and
a peripheral side surface connecting the first end surface and the second end surface,
the first end surface being formed in a substantially polygonal shape having a second corner formed at a second angle that is obtuse and a first corner adjacent to the second corner and formed at a first angle smaller than the second angle,
the second end surface being formed in a substantially polygonal shape having a fourth corner formed at a fourth angle that is obtuse and a third corner adjacent to the fourth corner and formed at a third angle smaller than the fourth angle,
the peripheral side surface including a first curved portion connecting the first corner and the third corner, a second curved portion connecting the second corner and the fourth corner, and a first side surface interposed between the first curved portion and the second curved portion,
the first side surface being inclined with respect to a center axis extending through each of a center of the first end surface and a center of the second end surface,
the second curved portion being provided with a grip portion,
the grip portion including a shape of a recessed portion formed to be spaced apart from each of the first end surface and the second end surface and recessed toward the center axis,
the tool main body having an injection hole from which a coolant is to be injected toward a cutting edge formed at the first corner,
the tool main body being configured such that at least a part of the coolant reaching the cutting edge from the injection hole passes through the inside of the recessed portion.

* * * * *